United States Patent
Simon et al.

(10) Patent No.: US 12,208,424 B2
(45) Date of Patent: Jan. 28, 2025

(54) GRIDDLE UTENSIL WITH SCRAPER AND SQUEEGEE

(71) Applicant: Halo Products Group, LLC, Elizabethtown, KY (US)

(72) Inventors: Paul J. Simon, Elizabethtown, KY (US); Michael R. Giebel, Joplin, MO (US)

(73) Assignee: WH PRODUCTS, LLC, Columbus, OH (US)

( * ) Notice: Subject to any disclaimer, the term of this patent is extended or adjusted under 35 U.S.C. 154(b) by 314 days.

(21) Appl. No.: 17/824,708

(22) Filed: May 25, 2022

(65) Prior Publication Data
US 2022/0379349 A1 Dec. 1, 2022

Related U.S. Application Data

(60) Provisional application No. 63/192,794, filed on May 25, 2021.

(51) Int. Cl.
  *B08B 1/00* (2024.01)
  *A47J 36/00* (2006.01)
  *B08B 1/16* (2024.01)

(52) U.S. Cl.
  CPC ............... *B08B 1/165* (2024.01); *A47J 36/00* (2013.01)

(58) Field of Classification Search
  CPC ........................... B08B 1/165; A47J 37/0786
  See application file for complete search history.

(56) References Cited

U.S. PATENT DOCUMENTS

| | | | | |
|---|---|---|---|---|
| 3,540,071 A | * | 11/1970 | Jorgensen | A47L 1/06 |
| | | | | 15/105 |
| 4,124,915 A | * | 11/1978 | Schlicher | B60S 3/045 |
| | | | | 15/245 |
| 5,398,364 A | * | 3/1995 | Vogt | A47L 1/06 |
| | | | | 15/105 |
| D362,093 S | * | 9/1995 | Vogt | D32/42 |
| D479,376 S | * | 9/2003 | Hsu | D32/49 |
| 9,101,253 B2 | * | 8/2015 | Johnstone | A47L 13/08 |
| D993,633 S | * | 8/2023 | Chen | D4/137 |
| 2003/0131431 A1 | * | 7/2003 | Hay | A46B 17/08 |
| | | | | 15/117 |
| 2004/0148727 A1 | * | 8/2004 | Veltrop | A47L 13/022 |
| | | | | 15/236.01 |
| 2018/0265051 A1 | * | 9/2018 | Cormier | G09F 23/00 |
| 2018/0304866 A1 | * | 10/2018 | Verbakel | A47L 13/16 |
| 2019/0283086 A1 | * | 9/2019 | Schindler | A47L 1/06 |

FOREIGN PATENT DOCUMENTS

| | | | | |
|---|---|---|---|---|
| CN | 108856007 A | * | 11/2018 | ............. B08B 1/005 |
| DE | 102019104601 A1 | * | 8/2019 | ............ E04F 21/163 |
| KR | 200276866 Y1 | * | 5/2002 | |

OTHER PUBLICATIONS

KR-200276866-Y1—English Machine Translation (Year: 2002).*

* cited by examiner

*Primary Examiner* — Marc Carlson
(74) *Attorney, Agent, or Firm* — David R Yohannan

(57) ABSTRACT

A cooking utensil having a handle and a rigid metal scraper head connected to the handle is disclosed. The scraper head may include a squeegee blade holder formed thereon, or attached thereto. A squeegee blade may be securely disposed in the squeegee blade holder.

18 Claims, 4 Drawing Sheets

GRIDDLE UTENSIL WITH SCRAPER AND SQUEEGEE

CROSS-REFERENCE TO RELATED APPLICATIONS

This application claims the benefit of U.S. Provisional Application No. 63/192,794 filed May 25, 2021, the disclosure of which is hereby incorporated by reference herein in its entirety.

FIELD OF THE INVENTION

Embodiments of the present invention relate to cooking and cleaning utensils.

BACKGROUND OF THE INVENTION

Outdoor cooking, and particularly the use of outdoor barbecue grills, smokers, and griddles, remains very popular. A number of different appliances are currently available to cook food outdoors. All such appliances include a cooking surface to support food items, and historically the most popular outdoor primary cooking surfaces have been grill surfaces. A grill surface typically includes spaced metal elements, such as rods, that support food items above a heat source and permit juices and grease to fall through the spaces between the spaced elements. A grill surface permits flames from some types of heat sources to come in direct contact with food items imparting a particular "flame cooked" flavor. Flame cooking results in grease dripping directly on to heating elements, such as propane burners, which in turn results in unwanted flare ups that can scorch the food in a matter of seconds. Thus, while the ability to flame cook a food item is sometimes desirable, it comes at a cost in terms of temperature control, grease management, and safety, among others.

Indeed, while professional kitchens may include a grill cooking surface, such kitchens nearly universally include a griddle cooking surface. Thus, there is no doubt that griddle cooking is desirable. Griddle cooking surfaces referred to herein include any cooking surfaces having a relatively flat, continuous, heated, normally metal, surface for supporting food. The primary difference between griddle surfaces and grill surfaces is that the former do not include spaced elements that permit direct contact between food and a heat source, such as a propane burner. As a consequence, griddle surfaces also do not permit grease to drip through the cooking surface to the heat source giving griddle surfaces an advantage in terms of temperature control, grease management, and safety due to the absence of any risk of flare ups.

Given the particular advantages of griddle cooking surfaces, it is only natural that there is a need for well-designed and well-functioning utensils for clearing grease and other food debris from griddle surfaces. Existing grease clearing utensils have some shortcomings as currently designed. For example, griddles typically include a grease receptacle to collect grease that evolves from cooking foods. Such grease receptacles are ordinarily accessed through a collection port or opening provided in the griddle surface. A metal scraper utensil may be used to direct grease and food debris along the griddle surface into the collection port. Such scrapers are known to have a straight metal scraping edge that engages the flat griddle surface. The metal scraping edge is useful for clearing burnt-on food particles in particular. However, as griddle surfaces age, they may tend to slightly buckle and warp, making them no longer truly flat and leaving gaps between the straight edge of a scraping utensil and the griddle surface during a scraping operation. While such gaps typically do not impede the scraper's ability to clear burnt-on food, they can prevent the scraper from effectively clearing grease. As a result, straight metal edged scraping utensils may not be capable of clearing all of the grease evolved during cooking.

Accordingly, there is a need for a griddle utensil that includes both a rigid metal scraping edge and a flexible scraping edge that permits the flexible edge to seal against non-flat, buckled or warped griddle surfaces.

There is also a need for a griddle utensil that includes a replaceable flexible scraping edge.

There is also a need for a griddle utensil for clearing grease that is easily stored in proximity to the griddle surface.

There is still further a need for a griddle utensil for clearing grease that is ergonomically shaped.

OBJECTS OF THE INVENTION

Accordingly, it is an object of some, but not necessarily all embodiments of the present invention to provide a griddle utensil that includes both a rigid metal scraping edge and a flexible scraping edge that permits the flexible edge to seal against non-flat, buckled or warped griddle surfaces.

It is also an object of some but not necessarily all embodiments of the present invention to provide a griddle utensil that includes a replaceable flexible scraping edge.

It is also an object of some but not necessarily all embodiments of the present invention to provide a griddle utensil for clearing grease that is easily stored in proximity to the griddle surface.

It is also an object of some but not necessarily all embodiments of the present invention to provide a griddle utensil for clearing grease that is ergonomically shaped.

SUMMARY OF EMBODIMENTS OF THE INVENTION

Responsive to the foregoing challenges, Applicant has developed an innovative cooking utensil, comprising: a handle having a center reference axis extending between a back end and a front end; a rigid metal scraper head connected to the handle, said scraper head having a first portion proximal to the handle front end and having a substantially V-shape, and a second portion distal from the handle front end; a squeegee blade holder formed on, or attached to, the second portion of the scraper head; and a squeegee blade having a base securely disposed in the squeegee blade holder.

Applicant has further developed an innovative cooking utensil, comprising: a handle having a center reference axis extending between a back end and a front end; a rigid metal scraper head connected to the handle, said scraper head having a first portion proximal to the handle front end and having a substantially V-shape, and a second portion distal from the handle front end; a squeegee blade holder formed on, or attached to, the second portion of the scraper head, said squeegee blade holder extending across substantially the entirety of the second portion and having an elongated channel extending across substantially the entirety of the second portion parallel to a channel reference axis; and a squeegee blade having a base securely disposed in the squeegee blade elongated channel, said base having a width dimension extending perpendicularly to the channel reference axis that is at least half or more of the length that a squeegee blade tip extends away from the second portion.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Reference will now be made in detail to embodiments of the present invention, an example of which is illustrated in the accompanying drawings. With reference to FIGS. 1-4, a griddle utensil 10 may include a handle 100 constructed primarily of a non-metal heat insulating material, such a plastic or wood. The handle 100 may have a back end and a front end spaced apart along a reference axis. The handle 100 may include a U-shaped swivel 102 at the back end. The handle 100 may be sized for being grasped and controlled by a single hand of a user.

A magnet 104 may be affixed to and/or imbedded in the handle 100 between the back end and the front end. The magnet 104 may be of sufficient strength to hold the griddle utensil 10 to another magnetic surface or metal surface against the force of gravity.

Figure 1:
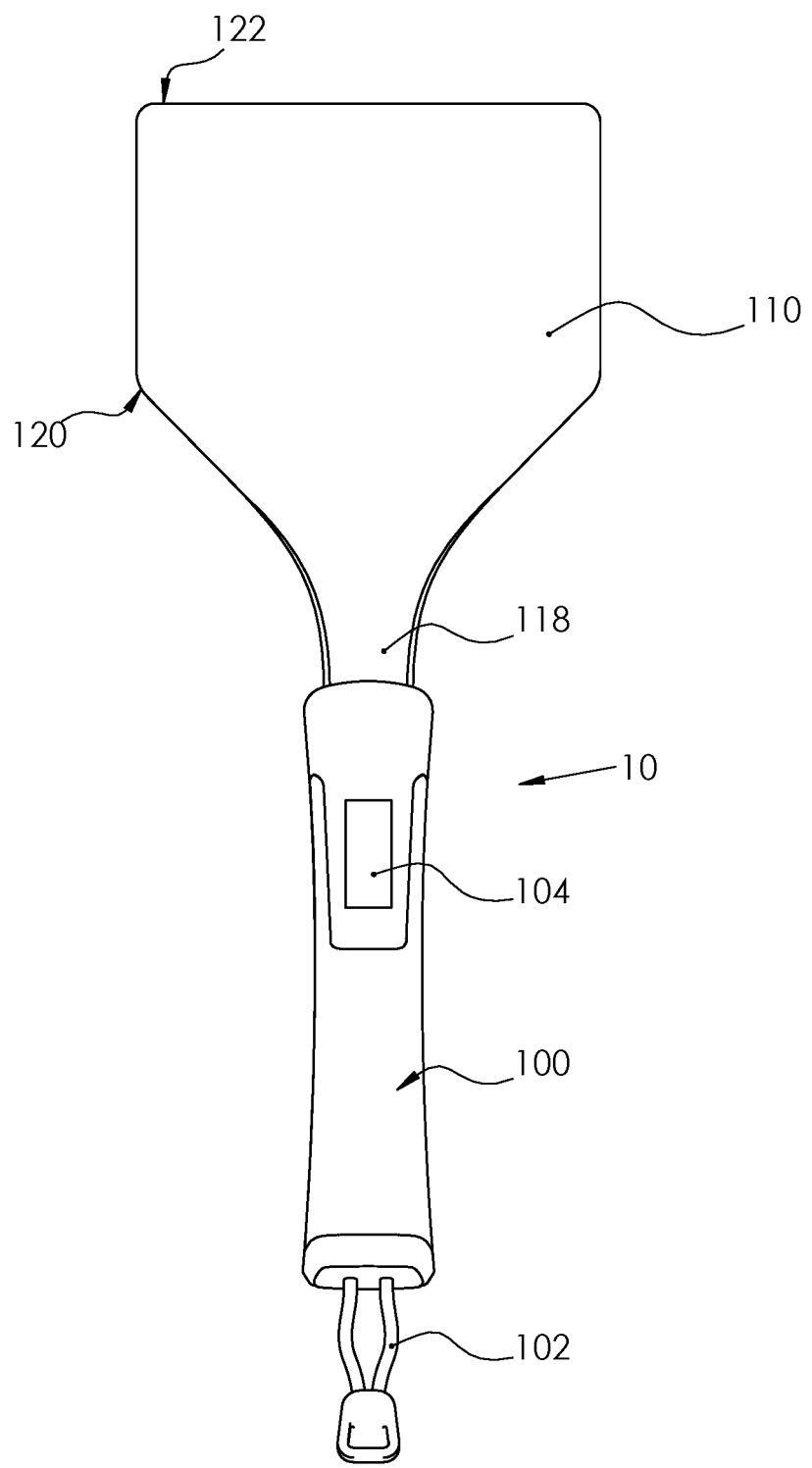
FIG. 1 is a bottom plan view of a griddle utensil in accordance with embodiments of the present invention.
Figure 2:
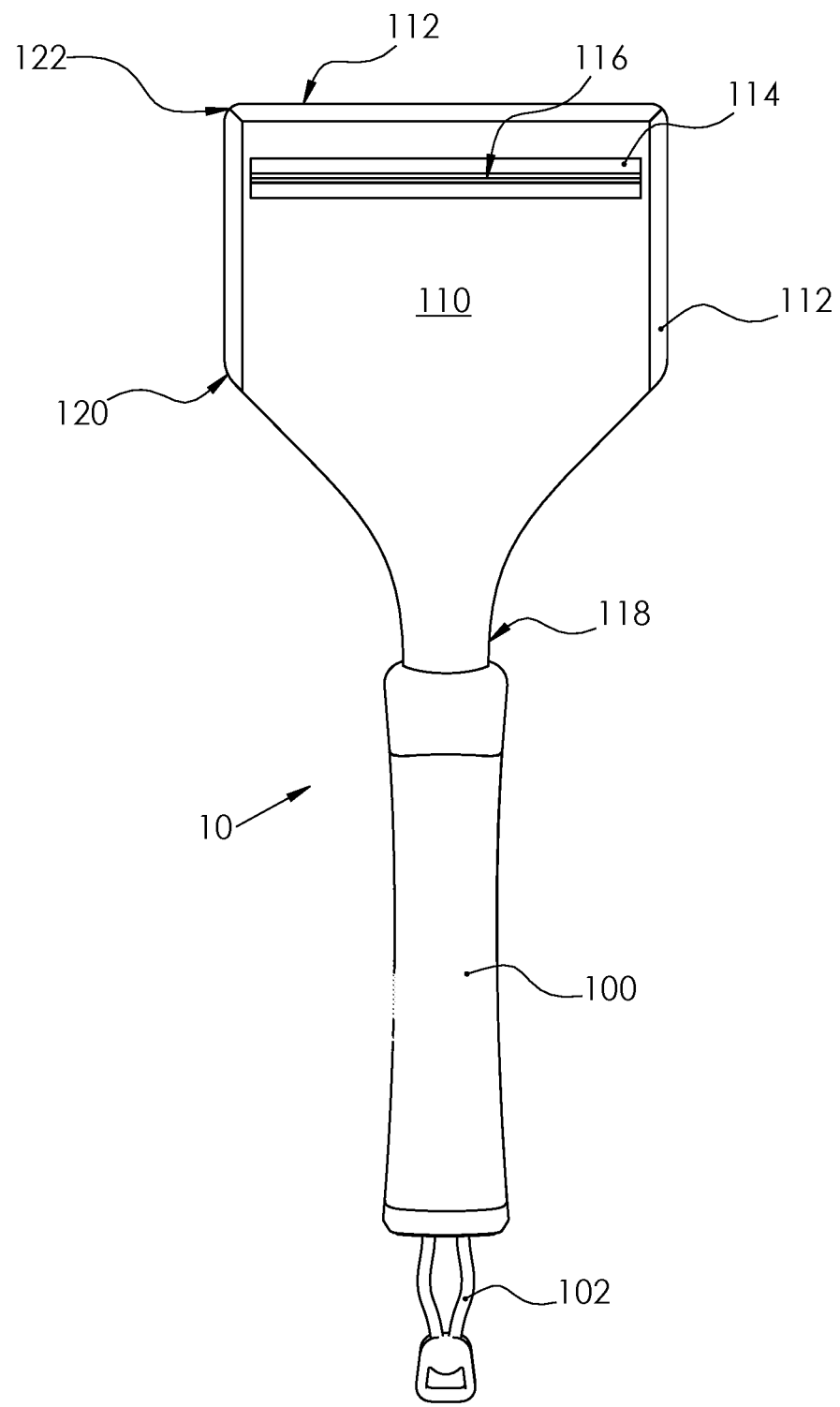
FIG. 2 is a top plan view of a griddle utensil in accordance with embodiments of the present invention.

A rigid metal substantially bent but flat scraper head 110 may be securely attached to the handle 100 at the handle front end by any attachment means or combination of attachment means, including without limitation, adhesive bonding, encapsulation, screws, rivets, and the like. The scraper head 110 may have a first portion that extends away from the handle 100 between opposing neck portions 118 and opposing shoulder points 120. The scraper head 110 may have first and second portions that meet at a bend extending between opposing shoulder points 120. The scraper head 110 first portion may extend in a first reference plane that is generally parallel with the handle reference axis. The scraper head 110 first portion may flare outward in a generally V-shape from the opposing neck points 118 to the opposing shoulder points 120. A second, thin flat portion of the scraper head 110 may extend away from the opposing shoulder points 120 to opposing tip points 122 in a second reference plane and may have a substantially rectangular shape when viewed as shown in FIGS. 1 and 2. The opposing edges of the second portion of the scraper head 110 extending between each set of shoulder points 120 and tip points 122, may do so along opposing and parallel reference lines. Each of these opposing and parallel reference lines, defining the side edges of the second portion of the scraper head 110, may form an oblique angle with the first portion of the scraper head where they intersect at the shoulder points 120. Preferably, beveled edges 112 are provided on the scraper head 110 between the pairs of shoulder points 120 and tip points 122 on each side of the scraper head, as well as between the opposing tip points. The first and second reference planes may intersect (i.e., at the bend point) at an angle preferably in the range of about 15 to 35 degrees.

Figure 3:
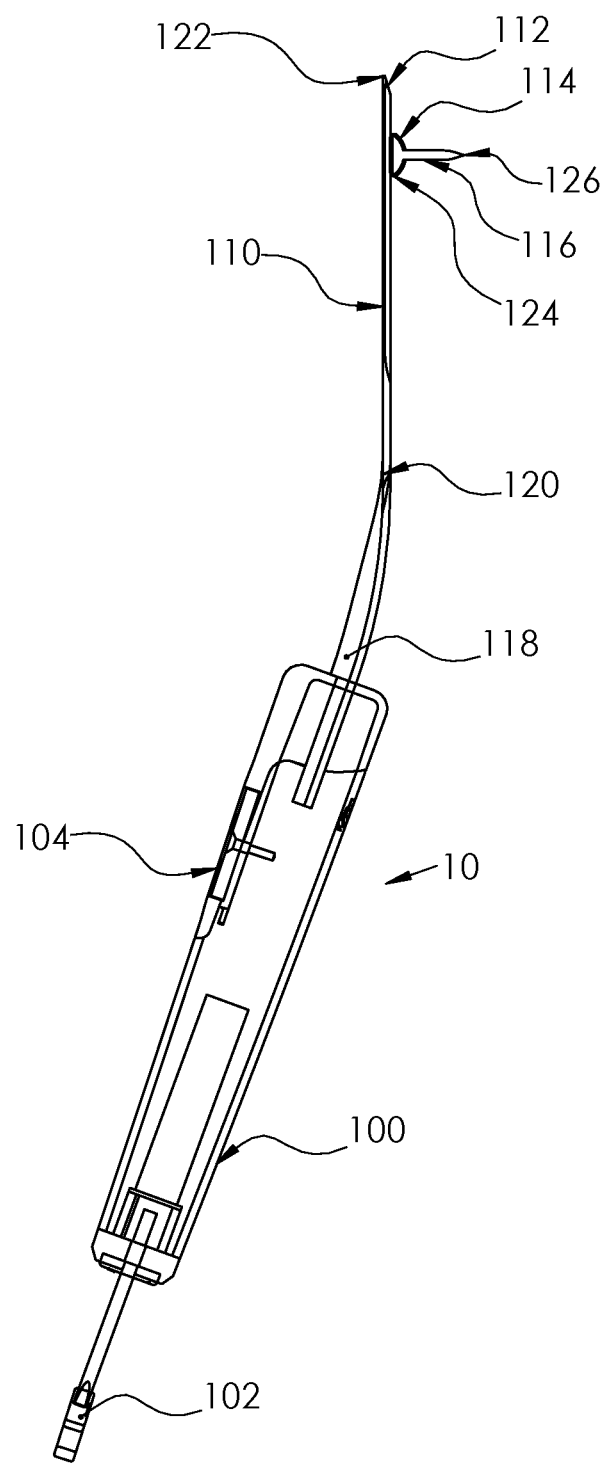
FIG. 3 is a side view of a griddle utensil in accordance with embodiments of the present invention.
Figure 4:
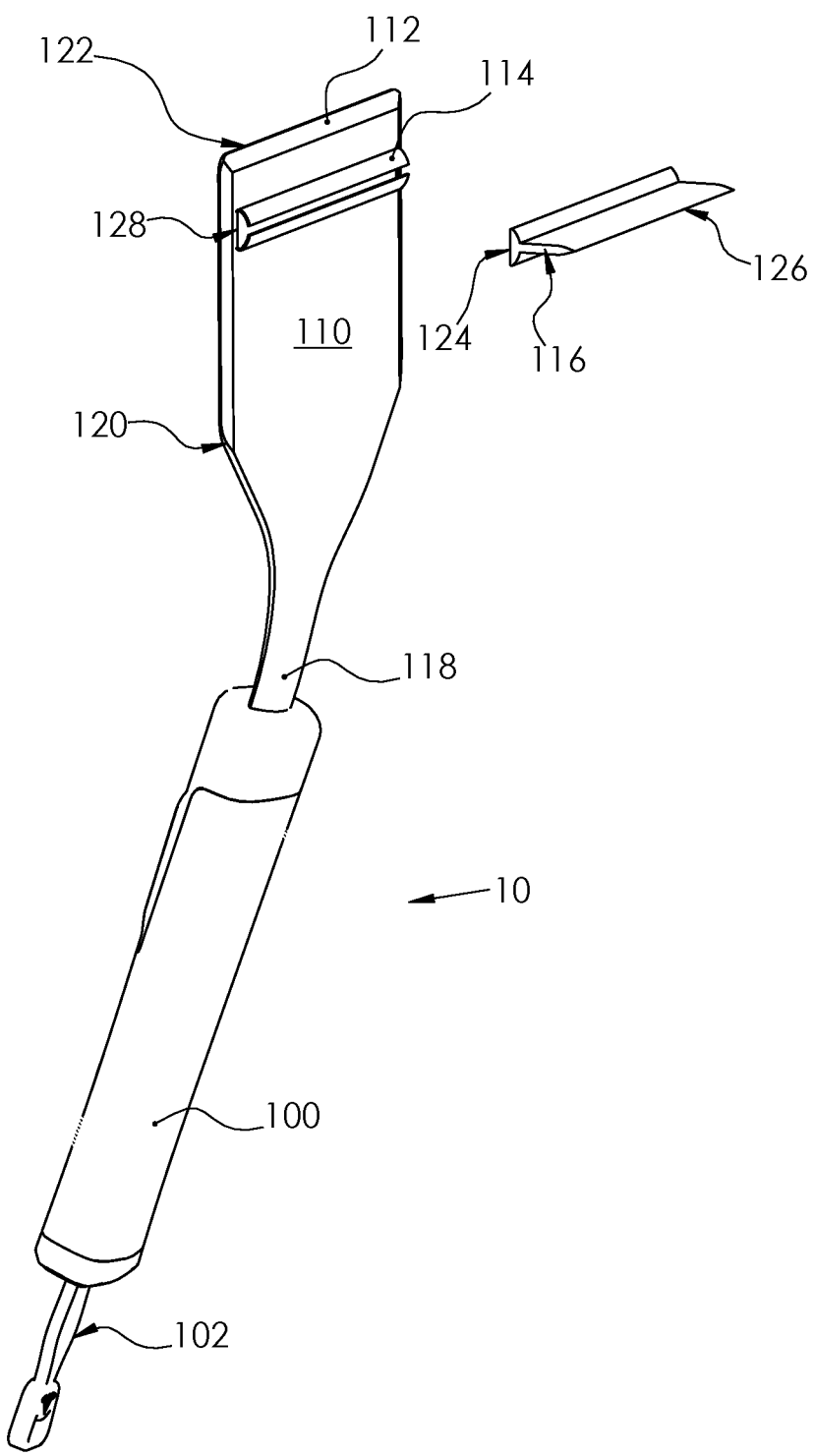
FIG. 4 is an exploded pictorial view of a griddle utensil having a scraper and a squeegee in accordance with embodiments of the invention.

With reference to FIGS. 2-4, the top surface of the second portion of the scraper head 110 may include a squeegee blade holder 114 formed thereon, or attached thereto. Preferably the squeegee blade holder 114 is constructed of metal or stiff plastic material. The squeegee blade holder 114 may have an elongated center axis that extends along a reference line that is substantially parallel to a reference line extending between the shoulder points 120. The elongated center axis of the squeegee blade holder 114 preferably may be spaced between ⅛ inch and 1 inch from the edge of the scraper head 110 most distal from the handle 100. The squeegee blade holder 114 may include an elongated channel 128 configured to securely receive the base portion 124 of a flexible squeegee blade 116. Both the squeegee blade holder 114 and the elongated channel 128 may extend across substantially the entirety of the second portion of the scraper head 110 parallel to a channel reference axis. The squeegee blade holder 114 base portion 124 may slide into and out of the channel 128 for blade replacement. While a broad base cross-section channel 128 is shown, it is appreciated that other channel shapes may be utilized without departing from the intended scope of the invention. Preferably, the squeegee blade holder 114 base portion 124 may have a width dimension extending perpendicularly to the channel reference axis that is at least half or more of the length that the tip 126 of the squeegee blade 116 extends away from the second portion of the scraper head 110. The squeegee blade 116 may extend away from the scraper head 110 at about a ninety (90) degree angle. Preferably the squeegee blade 116 is constructed of heat resistant flexible material and extends away from the scraper head 110 in the range of ¼ inch to 1 inch.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed:

1. A cooking utensil, comprising:
   a handle having a center reference axis extending between a back end and a front end;
   a rigid metal scraper head connected to the handle, said scraper head having a first portion proximal to the handle front end and having a substantially V-shape, and a second portion distal from the handle front end, said scraper head having a flat upper surface and a flat lower surface;
   a beveled edge extending between the scraper head flat upper surface and the scraper head flat lower surface, said beveled edge terminating at scraper head tip points extending between shoulder points provided on the scraper head flat lower surface;

a squeegee blade holder formed on, or attached to, the second portion of the scraper head on the scraper head flat upper surface; and a squeegee blade having a base securely disposed in the squeegee blade holder, wherein the tip points of the beveled edge are formed at the scraper head flat lower surface and the squeegee blade is provided on the scraper head flat upper surface such that the squeegee blade avoids contact with a scraping surface when the scraping surface is engaged with the tip points of the beveled edge of the scraper head.

2. The cooking utensil of claim 1 wherein the second portion has a substantially rectangular shape, and wherein the first and second portions merge at a bend provided near or between opposing shoulder points provided on the scraper head.

3. The cooking utensil of claim 2 wherein a majority of the first portion extends in a first reference plane that is generally parallel with the handle center reference axis.

4. The cooking utensil of claim 3 wherein the second portion is coplanar with a second reference plane, and wherein the first reference plane and the second reference plane intersect at an angle in the range of 15 to 35 degrees.

5. The cooking utensil of claim 4 wherein the squeegee blade holder has an elongated center axis that extends along a reference line that is substantially parallel to a reference line extending between the opposing shoulder points.

6. The cooking utensil of claim 5 wherein the elongated center axis of the squeegee blade holder is spaced between ⅛ inch and 1 inch from an edge of the scraper head most distal from the handle front end.

7. The cooking utensil of claim 6 wherein the squeegee blade extends away from the scraper head second portion at about a ninety (90) degree angle.

8. The cooking utensil of claim 7 wherein the squeegee blade is constructed of heat resistant flexible material and extends away from the scraper head second portion in the range of ¼ inch to 1 inch.

9. The cooking utensil of claim 8 further comprising a magnet affixed to or imbedded in the handle between the back end and the front end.

10. The cooking utensil of claim 1 wherein a majority of the first portion extends in a first reference plane that is generally parallel with the handle center reference axis.

11. The cooking utensil of claim 10 wherein the second portion is coplanar with a second reference plane, and wherein the first reference plane and the second reference plane intersect at an angle in the range of 15 to 35 degrees.

12. The cooking utensil of claim 1 wherein at least first and second outer edges of the second portion are beveled.

13. The cooking utensil of claim 1 wherein the first and second portions merge at a bend provided near or between opposing shoulder points provided on the scraper head, and wherein the squeegee blade holder has an elongated center axis that extends along a reference line that is substantially parallel to a reference line extending between the opposing shoulder points.

14. The cooking utensil of claim 13 wherein the elongated center axis of the squeegee blade holder is spaced between ⅛ inch and 1 inch from an edge of the scraper head most distal from the handle front end.

15. The cooking utensil of claim 1 wherein the squeegee blade extends away from the scraper head second portion at about a ninety (90) degree angle.

16. The cooking utensil of claim 1 wherein the squeegee blade is constructed of heat resistant flexible material and extends away from the scraper head second portion in the range of ¼ inch to 1 inch.

17. The cooking utensil of claim 1 further comprising a magnet affixed to or imbedded in the handle between the back end and the front end.

18. A cooking utensil, comprising:

a handle having a center reference axis extending between a back end and a front end;

a rigid metal scraper head connected to the handle, said scraper head having a first portion proximal to the handle front end and having a substantially V-shape, and a second portion distal from the handle front end, said scraper head having a flat upper surface and a flat lower surface;

a beveled edge extending between the scraper head flat upper surface and the scraper head flat lower surface, said beveled edge terminating at scraper head tip points extending between shoulder points provided on the scraper head flat lower surface;

a squeegee blade holder formed on, or attached to, the second portion of the scraper head on the scraper head flat upper surface, said squeegee blade holder extending across substantially the entirety of the second portion and having an elongated channel extending across substantially the entirety of the second portion parallel to a channel reference axis; and a squeegee blade having a base securely disposed in the squeegee blade elongated channel, said base having a width dimension extending perpendicularly to the channel reference axis that is at least half or more of the length that a squeegee blade tip extends away from the second portion, wherein the tip points of the beveled edge are formed at the scraper head flat lower surface and the squeegee blade is provided on the scraper head flat upper surface such that the squeegee blade avoids contact with a scraping surface when the scraping surface is engaged with the tip points of the beveled edge of the scraper head.

* * * * *